(12) United States Patent
Isogai et al.

(10) Patent No.: US 9,567,676 B2
(45) Date of Patent: *Feb. 14, 2017

(54) HARD COATING COMPOSITION FOR METAL SUBSTRATE

(75) Inventors: Takashi Isogai, Saitama (JP); Noboru Ohara, Saitama (JP); Masao Watanabe, Koshigaya (JP); Mitsuo Najima, Tokyo (JP); Kenji Kawai, Koga (JP); Hiroyuki Ishii, Saitama (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 12/294,579

(22) PCT Filed: Mar. 27, 2007

(86) PCT No.: PCT/JP2007/056380
§ 371 (c)(1),
(2), (4) Date: Sep. 25, 2008

(87) PCT Pub. No.: WO2007/116733
PCT Pub. Date: Oct. 18, 2007

(65) Prior Publication Data
US 2009/0054544 A1    Feb. 26, 2009

(30) Foreign Application Priority Data

Mar. 31, 2006   (JP) .................. 2006-096591

(51) Int. Cl.
| | | |
|---|---|---|
| *C09D 175/16* | (2006.01) | |
| *C23C 26/00* | (2006.01) | |
| *B05D 5/00* | (2006.01) | |
| *C08F 283/00* | (2006.01) | |
| *C08F 290/06* | (2006.01) | |
| *C08F 299/06* | (2006.01) | |
| *C08G 18/73* | (2006.01) | |
| *C08G 18/75* | (2006.01) | |
| *C08G 18/80* | (2006.01) | |
| *C08G 18/81* | (2006.01) | |
| *C09D 4/00* | (2006.01) | |
| *C09D 5/08* | (2006.01) | |
| *B05D 1/02* | (2006.01) | |
| *B05D 3/02* | (2006.01) | |
| *B05D 3/06* | (2006.01) | |

(52) U.S. Cl.
CPC .............. *C23C 26/00* (2013.01); *B05D 5/00* (2013.01); *C08F 283/006* (2013.01); *C08F 290/06* (2013.01); *C08F 290/067* (2013.01); *C08F 299/06* (2013.01); *C08G 18/73* (2013.01); *C08G 18/753* (2013.01); *C08G 18/755* (2013.01); *C08G 18/757* (2013.01); *C08G 18/758* (2013.01); *C08G 18/8016* (2013.01); *C08G 18/8175* (2013.01); *C09D 4/00* (2013.01); *C09D 5/08* (2013.01); *C09D 175/16* (2013.01); *B05D 1/02* (2013.01); *B05D 3/0209* (2013.01); *B05D 3/0254* (2013.01); *B05D 3/067* (2013.01); *B05D 2202/25* (2013.01)

(58) Field of Classification Search
CPC ................................. C08F 2/50; C09D 175/16
USPC ............... 522/90, 93, 152; 430/495, 945
See application file for complete search history.

(56) References Cited

U.S. PATENT DOCUMENTS

| | | | | |
|---|---|---|---|---|
| 433,296 | A |  | 7/1890 | Lupton |
| 4,507,458 | A | * | 3/1985 | Shiraki ............... C08G 18/672 427/127 |
| 4,555,472 | A |  | 11/1985 | Katagiri et al. |
| 4,587,201 | A |  | 5/1986 | Morikawa et al. |
| 5,322,861 | A | * | 6/1994 | Tsuge et al. ..................... 522/90 |
| 5,616,630 | A | * | 4/1997 | Heinze ................. C08G 18/671 522/104 |
| 5,989,778 | A |  | 11/1999 | Hozumi |
| 6,136,880 | A | * | 10/2000 | Snowwhite et al. ........... 522/64 |
| 6,139,933 | A |  | 10/2000 | Van Wijk |
| 6,440,519 | B1 |  | 8/2002 | Takase et al. |
| 6,943,202 | B2 | * | 9/2005 | Zhu et al. ....................... 522/90 |
| 7,132,460 | B2 |  | 11/2006 | Fujimoto et al. |
| 2001/0046644 | A1 |  | 11/2001 | Ukachi et al. |
| 2004/0010049 | A1 | * | 1/2004 | Takahashi ............ C08F 283/00 522/6 |
| 2004/0115436 | A1 | * | 6/2004 | Komiya et al. ............ 428/411.1 |
| 2005/0124714 | A1 | * | 6/2005 | Weikard ............... C09D 175/16 522/35 |
| 2005/0175818 | A1 | * | 8/2005 | Kawabata et al. ......... 428/195.1 |

(Continued)

FOREIGN PATENT DOCUMENTS

| | | |
|---|---|---|
| EP | 1413608 A1 | 4/2004 |
| EP | 2003173 A1 | 12/2008 |

(Continued)

OTHER PUBLICATIONS

Takahashi et al., JP 09-324135 Machine English Translation.*

(Continued)

*Primary Examiner* — Michael Pepitone
(74) *Attorney, Agent, or Firm* — Wood Herron & Evans LLP

(57) ABSTRACT

The object of the present invention is to provide a hard coating composition for a metal substrate, including a film-forming resin component which contains a urethane (meth) acrylate obtained by reacting a polyisocyanate compound, a polyol, and a (meth)acrylate monomer having a hydroxyl group, wherein the polyisocyanate compound is hydrogenated xylylene diisocyanate and/or dicyclohexylmethane diisocyanate.

9 Claims, No Drawings

(56) References Cited

U.S. PATENT DOCUMENTS

| | | | |
|---|---|---|---|
| 2005/0239916 A1* | 10/2005 | Day et al. | 522/157 |
| 2006/0079659 A1 | 4/2006 | Flosbach et al. | |
| 2006/0210722 A1 | 9/2006 | Lunzer et al. | |
| 2010/0221552 A1 | 9/2010 | Ishida et al. | |

FOREIGN PATENT DOCUMENTS

| | | | | |
|---|---|---|---|---|
| JP | 61-021117 A | | 1/1986 | |
| JP | 09-156034 | | 6/1997 | |
| JP | 9-324135 | | 12/1997 | |
| JP | 10-245467 | | 9/1998 | |
| JP | 11-005270 | | 1/1999 | |
| JP | 11-012495 A | | 1/1999 | |
| JP | 2001-323005 A | | 11/2001 | |
| JP | 2001-329030 A | | 11/2001 | |
| JP | 2002-69138 | | 3/2002 | |
| JP | 2002-212500 | | 7/2002 | |
| JP | 2002-219771 | | 8/2002 | |
| JP | 2002-230831 A | | 8/2002 | |
| JP | 2002-265858 | | 9/2002 | |
| JP | 2002-285083 A | | 10/2002 | |
| JP | 2003-119231 A | | 4/2003 | |
| JP | 2003-192980 | | 7/2003 | |
| JP | 2003-292881 | | 10/2003 | |
| JP | 2004-217879 A | | 8/2004 | |
| JP | 2005-171154 | * | 6/2005 | C08F 290/06 |
| JP | 2006-169308 | | 6/2006 | |
| JP | 2007-503491 | | 2/2007 | |
| TW | 200526701 A | | 8/2005 | |
| WO | 97/46627 A1 | | 12/1997 | |
| WO | 2000-09620 A1 | | 2/2000 | |
| WO | 2005/021614 A1 | | 3/2005 | |
| WO | 2007003462 A1 | | 1/2007 | |
| WO | 2007-116704 A1 | | 10/2007 | |

OTHER PUBLICATIONS

Japanese Patent Office, Search Report and Written Opinion in International Patent Application No. PCT/JP2007/056380 dated Jun. 26, 2007.

Official Action issued in Chinese Patent Application Serial No. 200780011202.4, mailed Aug. 3, 2011, 12 pages.

European Search Report issued in European Patent Application No. 07739818.8, dated Jun. 29, 2012, 5 pages.

European Patent Office, Search Report issued in Application No. 08765800.1, mailed Jun. 8, 2012, 6 pp.

Japanese Patent Office, Office Action issued in Application No. 2009-520592, mailed Jun. 19, 2012, 5 pp.

Japanese Patent Office, Office Action issued in Application No. 2009-520592, mailed May 28, 2013, 4 pp.

Japanese Patent Office, International Search Report issued in Application No. PCT/JP2008/061456, mailed Jul. 29, 2008, 3 pp.

Japanese Patent Office, Written Opinion issued in Application No. PCT/JP2008/061456, mailed Jul. 29, 2008, 7 pp.

U.S. Patent and Trademark Office, Non-Final Office Action issued in corresponding U.S. Appl. No. 12/602,671, mailed Apr. 4, 2012, 16 pp.

U.S. Patent and Trademark Office, Non-Final Office Action issued in corresponding U.S. Appl. No. 12/602,671, mailed Sep. 4, 2012, 13 pp.

U.S. Patent and Trademark Office, Final Office Action issued in corresponding U.S. Appl. No. 12/602,671, mailed Dec. 12, 2012, 11 pp.

U.S. Patent and Trademark Office, Non-Final Office Action issued in corresponding U.S. Appl. No. 12/602,671, mailed Sep. 9, 2013, 14 pp.

U.S. Patent and Trademark Office, Notice of Allowance issued in corresponding U.S. Appl. No. 12/602,671, mailed Dec. 19, 2013, 10 pp.

Taiwanese Patent Office; Office Action in Taiwanese Patent Application No. 096110447 mailed on Nov. 10, 2010.

* cited by examiner

HARD COATING COMPOSITION FOR METAL SUBSTRATE

TECHNICAL FIELD

The present invention relates to a coating composition preferably used for forming a hard coat on a metal substrate such as aluminum.

This application claims the priority of Japanese Patent Application No. 2006-096591, filed on Mar. 31, 2006, the contents of which are incorporated herein by reference.

BACKGROUND ART

As building materials, vehicle members, etc., those formed of a metal substrate such as aluminum are widely used. On the surface of such materials, a hard coat is frequently formed in order to impart abrasion resistance and rust resistance.

As examples of such a coating composition used therein, heat-curing types of coating compositions disclosed by Patent Documents 1 to 3 can be mentioned in general.

Patent Document 1: Japanese Unexamined Patent Publication No. 2002-265858.

Patent Document 2: Japanese Unexamined Patent Publication No. 2003-192980.

Patent Document 3: Japanese Unexamined Patent Publication No. 2003-292881.

DISCLOSURE OF THE INVENTION

However, such heat-curing types of coating compositions require a long time to cure. Therefore, there is a problem of low productivity.

Furthermore, a hard coat formed with a conventional coating composition frequently has insufficient adherence properties to a metal substrate, or excellent abrasion resistance or rust resistance cannot be imparted to a metal substrate by such a conventional hard coat.

The present invention was achieved based on the above-described circumstances. The object of the present invention is to provide a hard coating composition that can efficiently form a hard coat, having excellent adherence properties to a metal substrate and imparting high abrasion resistance and rust resistance to a metal substrate. An aspect of the present invention is to provide a hard coating composition for a metal substrate, including a film-forming resin component that contains a urethane (meth)acrylate obtained by reacting a polyisocyanate compound, a polyol and a (meth)acrylate monomer having a hydroxyl group, wherein the polyisocyanate compound is hydrogenated xylylene diisocyanate and/or dicyclohexylmethane diisocyanate.

It is preferable that 30% by mass or more of the urethane (meth)acrylate be included in the film-forming resin component.

The hard coating composition for a metal substrate of the present invention is preferably used for an aluminum substrate.

Another aspect of the present invention is to provide use of the hard coating composition for a metal substrate to form a hard coat on a metal substrate.

According to the hard coating composition of the present invention, a hard coat that has excellent adherence properties to a metal substrate and that can impart high abrasion resistance and rust resistance to the metal substrate can be produced at a high productivity.

BEST MODE FOR CARRYING OUT THE INVENTION

Hereinafter, the present invention will be described in detail.

In the present invention, "(meth)acrylate" includes methacrylate and acrylate.

The hard coating composition for a metal substrate of the present invention (hereinafter, simply referred to as "coating composition") is coated on a metal substrate such as aluminum, iron, nickel, chromium, copper, or an alloy thereof, and the coated coating composition is cured by irradiating an active-energy ray whereby a hard coat imparting abrasion resistance or rust resistance to the metal substrate can be formed. The coating composition includes a film-forming resin component that contains a urethane(meth)acrylate obtained by reacting a polyisocyanate compound, a polyol, and a (meth)acrylate monomer having a hydroxyl group.

As the polyisocyanate compound, hydrogenated xylylene diisocyanate and/or dicyclohexylmethane diisocyanate are used. When at least one of these compounds is used as the polyisocyanate compound, a hard coat that has excellent adherence properties to a metal substrate and that can impart high abrasion resistance or rust resistance thereto can be formed. When polyisocyanate compounds other than hydrogenated xylylene diisocyanate and/or dicyclohexylmethane diisocyanate, the initial hard coat may have sufficient adherence properties or abrasion resistance. However, the adherence properties will be lowered due to water content. Consequently, the rust resistance will also be lowered. In addition, hydrogenated xylylene diisocyanate and dicyclohexylmethane diisocyanate are available as commercial products.

Examples of the polyol include: polyetherpolyols such as polyethylene glycol, polypropylene glycol, or polytetramethylene glycol; polyvalent alcohols such as ethylene glycol, propylene glycol, or 1,6-hexanediol; polyesterpolyols obtained by reacting a polyvalent alcohol with a polybasic acid such as adipic acid; polycarbonate polyols; 1,4-cyclohexanediol; or 2,2'-bis(4-hydroxycyclohexyl)propane. These compounds may be used singularly or in combination. In particular, 1,6-hexanediol, 1,4-cyclohexanediol, and 2,2'-bis(4-hydroxylcyclohexyl)propane are preferable in terms of adherence properties, rust resistance and abrasion resistance of the resulting hard coat.

Examples of the (meth)acrylate monomer having a hydroxyl group include: 2-hydroxyethyl(meth)acrylate, 2-hydroxypropyl(meth)acrylate, glycerol di(meth)acrylate, or polyethylene glycol (meth)acrylate. These can be used singularly or in combination.

The above-described polyisocyanate compound and polyol are reacted, and the produced reaction product is further reacted with a (meth)acrylate monomer having a hydroxyl group to produce a urethane (meth)acrylate. In this case, the equivalent ratio of the polyisocyanate compound, the polyol, and the (meth)acrylate monomer having a hydroxyl group may be stoichiometrically determined. However, it is preferable that these compounds be used where, for example, polyol:polyisocyanate compound: (meth)acrylate monomer having a hydroxyl group=1:(1.1-2.0):(0.1-1.2). In addition, a generally known catalyst can be used in the reaction.

The film-forming resin component may be formed of only the above-described urethane(meth)acrylate. However, the film-forming resin component can contain other active energy ray-curable components in order to enhance the hardness of the formed hard coat, in order to provide a cost-effective hard coating composition, etc.; or can contain a thermoplastic resin to improve flowability of the coating composition.

However, if the ratio of the urethane(meth)acrylate in the film-forming resin component is 30% by mass or more, then, a hard coat that has excellent adherence properties to a metal substrate and that can impart higher abrasion properties and rust resistance to the metal substrate can be easily produced, and such a range is preferable. Specifically, the ratio of the urethane (meth)acrylate in the film-forming resin component is preferably within the range of 30% to 90% by mass, and more preferably within the range of 40% to 90% by mass.

As an example of other active-energy curable components, a compound having at least one (meth)acryloyl group per molecule can be mentioned. In particular, a compound having an alicyclic structure is preferable. This is because use of such a compound having an alicyclic structure in the molecule can improve adherence properties to a metal substrate and rust resistance.

Examples of such a compound having at least one (meth)acryloyl group per molecule include: methyl(meth)acrylate, ethyl(meth)acrylate, n-butyl(meth)acrylate, t-butyl(meth)acrylate, benzyl(meth)acrylate, ethoxyethyl(meth)acrylate, butoxyethyl(meth)acrylate, hydroxyethyl(meth)acrylate, cyclohexyl(meth)acrylate, t-butylcyclohexyl(meth)acrylate, dicyclohexylpentanyl acrylate, tricyclodecane dimethanol (meth)acrylate, or isobornyl(meth)acrylate.

It is preferable that the compound having one (meth)acryloyl group per molecule be a compound having an alicyclic structure. In particular, cyclohexyl(meth)acrylate, t-butylcyclohexyl (meth)acrylate, dicyclohexylpentanyl acrylate, tricyclodecane dimethanol (meth)acrylate, and isobornyl(meth)acrylate are preferable.

Examples of the compound having two (meth)acryloyl groups per molecule include: ethylene glycol di(meth)acrylate, diethylene glycol di(meth)acrylate, triethylene glycol di(meth)acrylate, tetraethylene glycol di(meth)acrylate, 2-(meth)acryloyloxyethyl acid phosphate, 1,4-butanediol di(meth)acrylate, 1,6-hexanediol di(meth)acrylate, 1,9-nonanediol di(meth)acrylate, glycerol di(meth)acrylate, neopentyl glycol di(meth)acrylate, 3-methyl-1,5-pentanediol di(meth)acrylate, 2-butyl-2-ethyl-1,3-propane di(meth)acrylate, dimethyloltricyclodecane di(meth)acrylate, propylene glycol di(meth)acrylate, dipropylene glycol di(meth)acrylate, tripropylene glycol di(meth)acrylate, tetrapropylene glycol di(meth)acrylate, neopentyl glycol hydroxypivalate di(meth)acrylate, 1,3-butanediol di(meth)acrylate, or dimethylol dicyclopentane diacrylate.

Among the above-described compounds, diethylene glycol di(meth)acrylate, dimethylol tricyclodecane di(meth)acrylate, dipropylene glycol di(meth)acrylate, and dimethylol dicyclopentane diacrylate are preferable. Furthermore, dimethylol tricyclodecane di(meth)acrylate and dimethylol dicyclopentane diacrylate having an alicyclic structure are more preferable.

Use of a compound having three or more (meth)acryloyl groups per molecule can further enhance the hardness of the formed hard coat. For example, tris(2-hydroxyethyl) isocyanurate tri(meth)acrylate, trimethylolpropane tri(meth)acrylate, pentaerythritol tri(meth)acrylate, propoxylated trimethylolpropane tri(meth)acrylate, ethoxylated trimethylolpropane tri(meth)acrylate, dimethylolpropane tetra(meth)acrylate, pentaerythritol tetra(meth)acrylate, propoxylated pantaerythritol tetra(meth)acrylate, ethoxylated pentaerythritol tetra(meth)acrylate, dipentaerythritol hexaacrylate, tris(acryloxyethyl) isocyanurate, etc. can be mentioned.

Among the above-mentioned compounds, trimethylolpropane tri(meth)acrylate and dipentaerythritol hexaacrylate are preferable.

As the other active energy ray-curable components, one or more types of a compound having one or more (meth)acryloyl groups per molecule, as described above, can be combined and included therein. As described above, when a compound having an alicyclic structure is used, adherence properties of the coating composition to a metal substrate can be improved, and rust resistance can be further enhanced. Therefore, use of such a compound is preferable. Such a compound may be used singularly or in combination. Additionally, even when such a compound is combined with a compound not having an alicyclic structure, it is expected that adherence properties to a metal substrate and rust resistance be further improved.

With regard to a urethane (meth)acrylate contained in the film-forming resin component of the present invention, as described above, a urethane (meth)acrylate synthesized with an isocyanate having an alicyclic structure is adopted because the produced hard coat can have sufficient adherence properties, rust resistance, and hard coat properties. However, if the film-forming resin component is prepared only from such a urethane (meth)acrylate synthesized from an isocyanate having an alicyclic structure, such a urethane (meth)acrylate is costly. Accordingly, the produced hard coat composition will be relatively expensive. Therefore, in order to provide a more cost-effective hard coat composition while having high adherence properties, rust resistance, hard coat properties, etc., other comparatively-cheap active energy ray-curable components may also be added thereto.

In general, with regard to the other active energy ray-curable components, when a monofunctional or bifunctional active energy ray-curable component having an alicyclic structure is included in the film-forming resin component, the produced coating film can have enhanced adherence properties and rust resistance. Furthermore, when a trifunctional or higher active energy ray-curable component is included in the film-forming resin component, the produced coating film can have enhanced hard coat properties.

That is, when a monofunctional or bifunctional active energy ray-curable component having an alicyclic structure and/or a trifunctional or higher active energy ray-curable component are combined as the other active energy ray-curable components with the above-described urethane (meth)acrylate synthesized from an isocyanate having an alicyclic structure to prepare the film-forming resin component, a cost-effective coating composition can be provided while maintaining excellent adherence properties of the produced coating film, rust resistance and hard coat properties.

The monofunctional or bifunctional active energy ray-curable component having an alicyclic structure and the trifunctional or higher active energy ray-curable component having an alicyclic structure can be selected suitably from the other active energy ray-curable components whose examples are described above. In particular, when at least one or more selected from cyclohexyl(meth)acrylate, t-butylcyclohexyl(meth)acrylate, dicyclohexylpentanyl acrylate, tricyclodecane dimethanol (meth)acrylate, isobornyl (meth)acrylate, diethylene glycol (meth)acrylate, dimethyloltricyclodecane di(meth)acrylate, dipropylene glycol di(meth)acrylate, dimethylol dicyclopentane diacrylate, trimethylolpropane tri(meth)acrylate, and dipentaerythrytol hexaacrylate are combined, a cost-effective coating composition can be provided while maintaining sufficient properties of the produced hard coat thereof. Therefore, such a combination is preferable.

With the amount of other active energy ray-curable components included therein, even if other active energy ray-curable components are not added thereto, the above-described effects of the present invention can be achieved. However, the amount of the other active energy ray-curable component are preferably within a range of 3% to 70% by mass, and more preferably within a range of 5% to 60% by mass with respect to the total of the film-forming resin component because hardness of the produced hard coat can be further enhanced while also retaining sufficient adherence properties, abrasion resistance, rust resistance, etc.

Examples of the thermoplastic resin includes: homopolymers such as methyl polymethacrylate, ethyl polymethacrylate, butyl polymethacrylate, or 2-ethylhexyl polymethacrylate, or a (meth)acrylate resin such as a copolymer thereof. In particular, methyl polymethacrylate is preferable.

The above-described thermoplastic resin may be added depending on purposes of the produced coating composition. Even if the thermoplastic resin is not added, the above-described effects of the present invention can be sufficiently achieved. In general, the amount of the thermoplastic resin is preferably within the range of 0% to 40% by mass, and more preferably within the range of 0.001% to 40% by mass with respect to the total of the film-forming resin component. This is because such a range can further improve fluidity of the coating composition or the like while maintaining adherence properties, abrasion resistance or rust resistance of the formed hard coat.

The coating composition generally contains a photo-polymerization initiator in addition to the above-described film-forming resin component. Examples of the photo-polymerization initiator includes commercial products (hereinafter, mentioned as produced names) such as Irgacure series (manufactured by Ciba specialty chemicals) such as Irgacure 184, Irgacure 149, Irgacure 651, Irgacure 907, Irgacure 754, Irgacure 819, Irgacure 500, Irgacure 1000, Irgacure 1800 or Irgacure 754; Lucirin TPO (produced by BASF); or Kayacure series (manufactured by Nippon Kayaku Co., Ltd.) such as Kayacure DETX-S, Kayacure EPA, or Kayacure DMBI. These may be used singularly or in combination. In particular, Irgacure 184 and Irgacure 819 are preferable.

In addition, a photosensitizer or a photoaccelerator may be combined with the photo-polymerization initiator.

The amount of the photo-polymerization initiator included therein is not particularly limited. An amount thereof where sufficient cross-linking density can be achieved may be adopted. However, the amount of the photo-polymerization initiator may be preferably within the range of 1 to 30 parts by mass with respect to 100 parts by mass of the total of the urethane (meth)acrylate and the other active energy ray-curable components.

The coating composition may contain typical solvents where necessary. Examples of solvents include: hydrocarbon-based solvent such as toluene, xylene, solvent naphtha, methylcyclohexane or ethylcyclohexane; ester-based solvents such as ethyl acetate, butyl acetate, or ethylene glycol monomethyl ether acetate; or ketone-based solvents such as acetone, methyl ethyl ketone, methyl isobutyl ketone, or diisobutyl ketone. These may be used singularly or in combination.

The amount of the solvent included therein is appropriately adjusted within a range where the effects of the present invention are not impaired. However, the amount of the solvent is preferably within a range of 0% to 40% by mass, and more preferably within a range of 0.001% to 40% by mass with respect to the total of the produced coating composition.

Additionally, the coating composition may contain additives generally used in coating materials (for example, a ultraviolet absorbing agent, anti-oxidizing agent, surface control agent, plasticizer, or pigment-anti-settling agent).

In addition to the above-described urethane (meth)acrylate, a film-forming resin component including the other active energy-curable components or the thermoplastic resin; and optional components such as a photo-polymerization initiator, a solvent, or typical additives are mixed to prepare the coating composition.

The coating composition prepared in this way is coated on a metal substrate by a spray coating method, brush coating method, roller coating method, curtain coating method, flow coating method, dip coating method, etc., such that the thickness of the cured coating film is about 5 µm to 100 µm. Then, the coated composition is irradiated with, for example, a ultraviolet ray of about 100 mJ to 3000 mJ (values measured with "UVR-N1" manufactured by Japan Storage Battery Co., Ltd.) for about 1 to 10 minutes using a fusion lamp, a high-pressure mercury-vapor lamp, a metal halide lamp, or the like whereby the hard coat can be produced.

As the active energy ray, an electron beam, gamma rays or the like can be used besides ultraviolet rays.

The metal substrates are not particularly limited. However, the above-described coating composition has excellent adherence properties and rust resistance to an aluminum substrate.

Furthermore, the purposes of such metal substrates are also not particularly limited. For example, building materials such as an aluminum sash, vehicle members, among others, can be mentioned.

A base coat paint may be coated on the hard coat formed in this way where necessary. A thermoset or active energy-curable coating material such as a metallic top coat paint may be further coated thereon. Furthermore, a top clear layer formed with a thermoset top clear paint (for example, an acryl-based lacquer composition, acrylic-melamine-curable clear paint, or aluminum chelate curable acryl-based paint) may be formed on the top coat.

Additionally, it is not always required to coat the coating composition directly on the surface of the metal substrate, and the coating composition may be coated onto the other layer formed by coating.

The above-described coating composition includes a film-forming resin component containing a urethane (meth)acrylate obtained by reacting a polyisocyanate compound, a polyol, and a (meth)acrylate monomer having a hydroxyly group. Because hydrogenated xylylene diisocyanate and/or dicyclohexylmethane diisocyanate are included therein as the polyisocyanate compound, a hard coat which has excellent adherence properties to a metal substrate and which imparts high abrasion resistance or rust resistance to the metal substrate can be formed.

In addition, the coating composition has active energy ray curability. Accordingly, the coating composition can be cured in a short time, compared to a thermoset-type composition, and a hard coat can be produced at a high productivity.

EXAMPLES

Hereinafter, the present invention will be described in detail with reference to Examples.

Synthesis of Urethane Acrylates A to D

Synthesis Example 1

59 parts by mass of 1,6-hexanediol (manufactured by UBE INDUSTRIES, LTD.), and 194 parts by mass of hydrogenated xylylene diisocyanate (manufactured by MITSUI TAKEDA CHEMICALS, INC.) were charged to a 500 ml flask equipped with a stirrer and a thermometer. These were reacted in a nitrogen stream at 70° C. for four hours. Then, 116 parts by mass of 2-hydroxylethyl acrylate (manufacture by Kyoei Kagaku Kogyo), 0.6 parts by mass of hydroquinone, and 0.3 parts by mass of dibutyltin dilaurate were added to the flask. These were further reacted at 70° C. for five hours while air-bubbling the content inside the flask whereby urethane acrylate "A" was obtained.

Synthesis Example 2

Urethane acrylate "B" was produced in the same manner as Synthesis Example 1 except that 262 parts by mass of dicyclohexylmethane diisocyanate (Sumitomo Bayer Urethane Co., Ltd.) were added instead of 194 parts by mass of hydrogenated xylylene diisocyanate.

Synthesis Example 3

Urethane acrylate "C" was produced in the same manner as Synthesis Example 1 except that 222 parts by mass of isophorone diisocyanate (manufactured by Evonik Degussa Japan) were added instead of 194 parts by mass of hydrogenated xylylene diisocyanate.

Synthesis Example 4

Urethane acrylate "D" was produced in the same manner as Synthesis Example 1 except that 168 parts by mass of hexamethylene diisocyanate (manufactured by Nippon Polyurethane Industry Co., Ltd.) were added instead of 194 parts by mass of hydrogenated xylylene diisocyanate.

Example 1

A liquid coating composition was prepared by mixing each component at the solid content ratio (mass ratio) shown in Table 1.

Then, the coating composition was spray-coated on the surface of an aluminum substrate with a spray gun such that the thickness of the cured coating film was 20 μm. After the solvent was dried at 80° C. for three minutes, it was irradiated with a ultraviolet ray of 300 mJ (a value measured with "UVR-N1" manufactured by Japan Storage Battery Co., Ltd.) using a high-pressure mercury-vapor lamp for two to three minutes to form a hard coat. This was used as a test piece.

The test piece produced in this way was evaluated in terms of initial adherence properties, adherence properties after water-resistance test, rust resistance, and abrasion resistance (pencil hardness). The results are shown in Figure 1.

Examples 2 to 11 and Comparative Examples 1 to 8

Each component was mixed at a solid content ratio (mass ratio) shown in Tables 1 and 2 to prepare a liquid coating composition. Except that each coating composition obtained in this way was use to prepare a test piece, initial adherence properties, adherence properties after water-resistance test, rust resistance, and abrasion resistance (pencil hardness) were evaluated in the same manner as Example 1 in the following way. The results are shown in Tables 1 and 2.

[Preparation of Test Piece and Test Method]

1. Initial Adherence Properties

The coating film of each test piece was cross-cut in a 10×10 lattice pattern of 1 mm width, and tape was adhered to the cross-cut area and then removed. When the coating film was not adhered on the tape, it was evaluated as "excellent". When the corner of the lattice was slightly cracked, it was evaluated as "fair". When at least one lattice was separated from the substrate, adhering to the tape, it was evaluated as "inferior". Based on this, test pieces were graded. The results are shown in Tables 1 and 2. In addition, the tape was a cellophane adhesive tape.

2. Adherence Properties after Water-Resistance Test

With regard to Examples, test pieces were soaked in hot water at 40° C. for 240 hours and for 480 hours. Then, each test piece was cross-cut in a 10×10 lattice pattern of 1 mm width, and a tape was adhered to the cross-cut area and then removed. On the other hand, with regard to Comparative Examples, test pieces were soaked in hot water at 40° C. for 240 hours. Then, each test piece was subjected to the same procedures.

Each test piece was graded as "excellent", "fair" or "inferior", based on the above-mentioned standards. The results are shown in Tables 1 and 2.

3. Rust Resistance

A CASS test (copper-accelerated acetic acid salt spray test) was conducted using a CASS test machine ("SQ-800-CA" produced by Itabashi Rikakogyo co Ltd.), based on "JIS H 8681-2" for 120 hours and 240 hours in Examples and for 120 hours for Comparative Examples. When rust was not visually observed, it was evaluated as "excellent". When rust was slightly observed, it was evaluated as "fair". When rust was obviously observed, it was evaluated as "inferior". The results are shown in Tables 1 and 2.

4. Abrasion Resistance (Pencil Hardness)

The pencil hardness of each coating film was measured based on "JIS K 5600". When the hardness thereof was "3H" or higher, it was evaluated as "excellent". When the hardness was less than "3H", it was evaluated as "inferior". The results are shown in Tables 1 and 2.

In addition, each components indicated in Tables are as follows.

(1) Diethylene glycol diacrylate is manufactured by DAICEL-CYTEC COMPANY LTD.;

(2) Dipropylene glycol diacrylate is manufactured by DAICEL-CYTEC COMPANY LTD.;

(3) Trimethylolpropane triacrylate is manufactured by Nippon Kayaku Co., Ltd.;

(4) Dipentaerythritol hexaacrylate is manufactured by Nippon Kayaku Co., Ltd.;

(5) Cyclohexyl acrylate is "BLEMMER® CHA" (product name) manufactured by NOF CORPORATION;

(6) Dicyclopentanyl acrylate is "FANCRYL FA-513A" (product name) manufactured by Hitachi Chemical Co., Ltd.;
(7) Dimethylol dicyclopentane diacrylate is "IRR-214" (product name) manufactured by DAICEL-CYTEC COMPANY LTD.;
(8) Tris(acryloxyethyl)isocyanurate is "Aronix M-315" (product name) manufactured by TOAGOSEI CO., LTD.;
(9) Methyl polymethacrylate is "Acrybase LH101" (product name) manufactured by FUJIKURA KASEI CO., LTD. (solid content: 40% by mass);
(10) "Irgacure 184" (product name) is manufactured by Ciba Specialty Chemicals;
(11) "Irgacure 819" (product name) is manufactured by Ciba Specialty Chemicals;

TABLE 1

| | Examples | | 1 | 2 | 3 | 4 | 5 | 6 | 7 | 8 | 9 | 10 | 11 |
|---|---|---|---|---|---|---|---|---|---|---|---|---|---|
| Film-forming resin component | Urethane acrylate A | | 100 | 0 | 50 | 50 | 100 | 50 | 50 | 100 | 40 | 40 | 50 |
| | Urethane acrylate B | | 0 | 100 | 0 | 0 | 0 | 0 | 0 | 0 | 0 | 0 | 0 |
| | Active energy ray-curable component | Diethylene glycol diacryalte | 0 | 0 | 50 | 0 | 0 | 0 | 0 | 0 | 0 | 0 | 0 |
| | | Dipropylene glycol diacrylate | 0 | 0 | 0 | 50 | 0 | 0 | 0 | 0 | 0 | 0 | 0 |
| | | Trimethylolpropane triacrylate | 0 | 0 | 0 | 0 | 0 | 50 | 0 | 0 | 0 | 10 | 0 |
| | | Dipentaerythritol hexaacrylate | 0 | 0 | 0 | 0 | 0 | 0 | 50 | 0 | 0 | 0 | 0 |
| | | Cyclohexyl acrylate | 0 | 0 | 0 | 0 | 0 | 0 | 0 | 0 | 60 | 0 | 0 |
| | | Dicyclopentanyl acrylate | 0 | 0 | 0 | 0 | 0 | 0 | 0 | 0 | 0 | 50 | 0 |
| | | Dimethylol dicyclopentane diacrylate | 0 | 0 | 0 | 0 | 0 | 0 | 0 | 0 | 0 | 0 | 40 |
| | Thermoplastic resin | Methyl polymethacrylate | 0 | 0 | 0 | 0 | 60 | 0 | 0 | 0 | 0 | 0 | 0 |
| Photopolymerization initiator | Irgacure 184 | | 3 | 3 | 3 | 3 | 3 | 3 | 3 | 0 | 3 | 3 | 3 |
| | Irgacure 819 | | 0 | 0 | 0 | 0 | 0 | 0 | 0 | 3 | 0 | 0 | 0 |
| Solvent | Ethyl acetate | | 50 | 50 | 50 | 50 | 100 | 50 | 50 | 50 | 30 | 30 | 40 |
| Evaluation | Initial adherence properties | | Excellent | Excellent | Excellent | Excellent | Excellent | Excellent | Excellent | Excellent | Excellent | Excellent | Excellent |
| | Adherence properties after water-resistance test | After 240 hours | Excellent | Excellent | Excellent | Excellent | Excellent | Excellent | Excellent | Excellent | Excellent | Excellent | Excellent |
| | | After 480 hours | Excellent | Excellent | Fair | Fair | Fair | Fair | Fair | Excellent | Excellent | Excellent | Excellent |
| | Rust resistance | After 120 hours | Excellent | Excellent | Excellent | Excellent | Excellent | Excellent | Excellent | Excellent | Excellent | Excellent | Excellent |
| | | After 240 hours | Excellent | Excellent | Fair | Fair | Fair | Fair | Fair | Excellent | Excellent | Excellent | Excellent |
| | Abrasion resistance (Pencil hardness) | | Excellent | Excellent | Excellent | Excellent | Excellent | Excellent | Excellent | Excellent | Excellent | Excellent | Excellent |

TABLE 2

| | Comparative Examples | | 1 | 2 | 3 | 4 | 5 | 6 | 7 | 8 |
|---|---|---|---|---|---|---|---|---|---|---|
| Film-forming resin component | Urethane acrylate C | | 100 | 0 | 0 | 0 | 0 | 0 | 0 | 0 |
| | Urethane acrylate D | | 0 | 100 | 0 | 0 | 0 | 0 | 0 | 0 |
| | Active energy ray-curable component | Tris (acryloxyethyl) isocyanurate | 0 | 0 | 100 | 0 | 0 | 0 | 0 | 0 |
| | | Diethylene glycol diacryalte | 0 | 0 | 0 | 100 | 0 | 0 | 0 | 0 |
| | | Dipropylene glycol diacrylate | 0 | 0 | 0 | 0 | 100 | 0 | 0 | 0 |

TABLE 2-continued

| Comparative Examples | | | 1 | 2 | 3 | 4 | 5 | 6 | 7 | 8 |
|---|---|---|---|---|---|---|---|---|---|---|
| | | Trimethylol propane triacrylate | 0 | 0 | 0 | 0 | 0 | 100 | 100 | 0 |
| | | Dipentaerythritol hexaacrylate | 0 | 0 | 0 | 0 | 0 | 0 | 0 | 100 |
| | Thermoplastic resin | Methyl polymethacrylate | 0 | 0 | 0 | 0 | 0 | 60 | 0 | 0 |
| Photo-polymerization initiator | | Irgacure 184 | 3 | 3 | 3 | 3 | 3 | 3 | 3 | 0 |
| | | Irgacure 819 | 0 | 0 | 0 | 0 | 0 | 0 | 0 | 3 |
| Solvent | | Ethyl acetate | 50 | 50 | 50 | 50 | 50 | 100 | 50 | 50 |
| Evaluation | | Initial adherence properties | Excellent | Excellent | Excellent | Excellent | Excellent | Excellent | Inferior | Inferior |
| | | Adherence properties after water-resistance test | Inferior | Inferior | Inferior | Inferior | Inferior | Excellent | Inferior | Inferior |
| | | Rust resistance | Inferior | Inferior | Inferior | Inferior | Inferior | Inferior | Inferior | Inferior |
| | | Abrasion resistance (Pencil hardness) | Excellent | Excellent | Excellent | Inferior | Inferior | Excellent | Excellent | Excellent |

As shown in Tables 1 and 2, hard coats could be formed in the Examples, in which their adherence properties to the metal substrate were not lowered due to the water content therein, their rust resistance was excellent, and their abrasion resistance was also excellent having high pencil hardness. On the other hand, the adherence properties of hard coats were lowered due to the water content, and their rust resistance was also impaired in Comparative Examples 1 and 2 where polyisocyanate compounds other than hydrogenated xylylene diisocyanate and hydrogenated dicyclohexylmethane diisocyanate in synthesis of urethane (meth)acrylates. Moreover, a hard coat having sufficient adherence properties, rust resistance and abrasion resistance could not be formed in coating compositions not including a urethane (meth)acrylate (Comparative Examples 3 to 6).

Additionally, with regard to Examples 1, 2 and 8 where their film-forming resin component was prepared with only urethane acrylate A or B, all the hard coats had excellent adherence properties, rust resistance and abrasion resistance. Furthermore, with regard to inclusion of the other components in the film-forming resin component in addition to urethane acrylate A, Examples 9 to 11 containing an active energy ray-curable component having an alicyclic structure showed very high adherence properties, rust resistance and abrasion resistance.

INDUSTRIAL APPLICABILITY

According to the hard coating composition of the present invention, a hard coat that has excellent adherence properties to a metal substrate and that can impart high abrasion resistance or rust resistance to the metal substrate can be formed at a high productivity. Accordingly, the hard coating composition of the present invention can be applied to metal substrates used in various arts such as building materials or vehicle members, and therefore, has high industrial applicability.

The invention claimed is:

1. A hard coating composition for a metal substrate consisting of:
    a film-forming resin component consisting of (i) a urethane (meth)acrylate obtained by reacting a polyisocyanate compound, a polyol, and a (meth)acrylate monomer having a hydroxyl group, and (ii) an active energy ray-curable component having an alicyclic structure,
    a photo-polymerization initiator, and
    a solvent, wherein
    the polyisocyanate compound is dicyclohexylmethane diisocyanate,
    the polyol is at least one selected from the group consisting of 1,4-cyclohexanediol and 2,2'-bis(4-hydroxycyclohexyl)propane,
    the amount of the photo-polymerization initiator is within a range of 1 to 3 parts by mass with respect to 100 parts by mass of the urethane (meth)acrylate,
    the amount of the solvent is within a range of 0.001% to 40% by mass with respect to the total of the coating composition;
    the active energy ray-curable component is at least one selected from the group consisting of cyclohexyl(meth)acrylate, t-butylcyclohexyl(meth)acrylate, dicyclohexylpentanyl acrylate, tricyclodecane dimethanol (meth)acrylate, isobornyl (meth)acrylate, dimethyloltricyclodecane di(meth)acrylate, and dimethylol dicyclopentane diacrylate; and
    the amount of the active energy ray-curable component is within a range of 5% to 60% by mass with respect to the total of the film-forming resin component.

2. The hard coating composition for a metal substrate according to claim 1 which is used for an aluminum substrate.

3. A hard coating composition for a metal substrate consisting of:
    a film-forming resin component consisting of (i) a urethane (meth)acrylate obtained by reacting a polyisocyanate compound, a polyol, and a (meth)acrylate monomer having a hydroxyl group, and (ii) an active energy ray-curable component having an alicyclic structure,
    a photo-polymerization initiator, and
    a solvent, wherein
    the polyisocyanate compound is hydrogenated xylylene diisocyanate,
    the polyol is at least one selected from the group consisting of 1,4-cyclohexanediol and 2,2'-bis(4-hydroxycyclohexyl)propane, the amount of the photo-polymerization initiator is within a range of 1 to 30 parts by mass with respect to 100 parts by mass of the urethane (meth)acrylate, the amount of the solvent is within a range of 0.001% to 40% by mass with respect to the total of the coating composition;

the active energy ray-curable component is at least one selected from the group consisting of cyclohexyl(meth)acrylate, t-butylcyclohexyl(meth)acrylate, dicyclohexylpentanyl acrylate, tricyclodecane dimethanol (meth)acrylate, isobornyl (meth)acrylate, dimethyloltricyclodecane di(meth)acrylate, and dimethylol dicyclopentane diacrylate; and the amount of the active energy ray-curable component is within a range of 5% to 60% by mass with respect to the total of the film-forming resin component.

4. The hard coating composition for a metal substrate according to claim 1, wherein the polyol is 1,4-cyclohexanediol.

5. The hard coating composition for a metal substrate according to claim 1, wherein the polyol is 2,2'-bis(4-hydroxycyclohexyl)propane.

6. The hard coating composition for a metal substrate according to claim 1, wherein the (meth)acrylate monomer having a hydroxyl group is 2-hydroxyethyl(meth)acrylate, 2-hydroxypropyl(meth)acrylate, glycerol dimethacrylate, polyethylene glycol (meth)acrylate, or a combination thereof.

7. The hard coating composition for a metal substrate according to claim 6, wherein the (meth)acrylate monomer having a hydroxyl group is 2-hydroxyethyl(meth)acrylate.

8. The hard coating composition for a metal substrate according to claim 1, wherein 30% by mass or more of the urethane (meth)acrylate is contained in the film-forming resin component.

9. The hard coating composition for a metal substrate according to claim 3, wherein 30% by mass or more of the urethane (meth)acrylate is contained in the film-forming resin component.

* * * * *